United States Patent
Manuja et al.

(10) Patent No.: US 7,764,612 B2
(45) Date of Patent: Jul. 27, 2010

(54) CONTROLLING ACCESS TO A HOST PROCESSOR IN A SESSION BORDER CONTROLLER

(75) Inventors: Ajay Manuja, Lexington, MA (US); Patrick John McLampy, Pepperell, MA (US); Ephraim Webster Dobbins, Windham, NH (US); Robert Flagg Penfield, Concord, MA (US)

(73) Assignee: Acme Packet, Inc., Burlington, MA (US)

( * ) Notice: Subject to any disclaimer, the term of this patent is extended or adjusted under 35 U.S.C. 154(b) by 1023 days.

(21) Appl. No.: 11/153,983

(22) Filed: Jun. 16, 2005

(65) Prior Publication Data

US 2006/0285493 A1    Dec. 21, 2006

(51) Int. Cl.
*H04L 1/00* (2006.01)
(52) U.S. Cl. ........................................ 370/231; 370/352
(58) Field of Classification Search ................. 370/229, 370/230, 230.1, 231, 31, 236, 352, 356, 412, 370/466, 392, 493, 353, 354, 355, 358, 395.2, 370/389, 394, 428, 232, 235, 395.21, 398; 709/206, 223, 224, 229, 234, 235; 379/88.22, 379/211.02, 212.01
See application file for complete search history.

(56) References Cited

U.S. PATENT DOCUMENTS

| | | | | |
|---|---|---|---|---|
| 4,921,464 A * | 5/1990 | Ito et al. | ...................... | 455/512 |
| 5,442,807 A * | 8/1995 | Takayama | ................... | 455/453 |
| 5,724,346 A * | 3/1998 | Kobayashi et al. | .......... | 370/329 |
| 5,953,312 A * | 9/1999 | Crawley et al. | ............. | 370/218 |
| 6,141,757 A * | 10/2000 | Seeker et al. | ................... | 726/22 |
| 6,438,110 B1 * | 8/2002 | Rai et al. | ..................... | 370/254 |
| 6,931,253 B1 * | 8/2005 | Hartikainen et al. | ........ | 455/450 |
| 6,976,087 B1 * | 12/2005 | Westfall et al. | ............. | 709/238 |
| 7,133,400 B1 * | 11/2006 | Henderson et al. | .......... | 370/389 |
| 7,209,473 B1 * | 4/2007 | Mohaban et al. | ............ | 370/352 |
| 7,411,975 B1 * | 8/2008 | Mohaban | ..................... | 370/466 |
| 7,522,579 B1 * | 4/2009 | Mangal et al. | .............. | 370/352 |
| 7,522,601 B1 * | 4/2009 | Morrow | ...................... | 370/392 |
| 2002/0105910 A1 * | 8/2002 | Maher et al. | ................. | 370/235 |

(Continued)

OTHER PUBLICATIONS

Jon Hardwick, Session Border Controllers Enabling the VOIP Revolution, Data Connection, pp. 1-44, http://www.dataconnection.com/network/download/whitepapers/sessionbordercontroller.pdf.*

*Primary Examiner*—Aung S Moe
*Assistant Examiner*—Abdullah Riyami
(74) *Attorney, Agent, or Firm*—Thomas, Kayden, Horstemeyer & Risley, LLP

(57) ABSTRACT

Methods and systems for controlling access to a host processor is disclosed. One exemplary method comprises the steps of receiving a plurality of signaling packets and controlling access to a host processor, via a first and a second path, for at least a portion of the packets in accordance with a bandwidth limit for the respective path. An exemplary system comprises: a host processor; and a traffic manager coupled to the host processor via a first path and a second path. The traffic manager is configured to communicate at least a portion of the packets to the host processor via a selected one of the paths. The traffic manager is further configured to regulate traffic along the first path such that the bandwidth limit of the first path is respected, and to regulate traffic along the second path such that the bandwidth limit of the second path is respected.

42 Claims, 12 Drawing Sheets

U.S. PATENT DOCUMENTS

| | | | |
|---|---|---|---|
| 2002/0144065 A1* | 10/2002 | Mills et al. | 711/147 |
| 2002/0174244 A1* | 11/2002 | Beckwith et al. | 709/231 |
| 2002/0188871 A1* | 12/2002 | Noehring et al. | 713/201 |
| 2003/0058796 A1* | 3/2003 | Anderson, Sr. | 370/236 |
| 2003/0140124 A1* | 7/2003 | Burns | 709/220 |
| 2003/0145077 A1* | 7/2003 | Khan et al. | 709/224 |
| 2003/0198189 A1* | 10/2003 | Roberts et al. | 370/252 |
| 2003/0210677 A1* | 11/2003 | Grove et al. | 370/352 |
| 2003/0214928 A1* | 11/2003 | Chuah | 370/336 |
| 2003/0221015 A1* | 11/2003 | Basso et al. | 709/234 |
| 2003/0229710 A1* | 12/2003 | Lie et al. | 709/231 |
| 2004/0071130 A1* | 4/2004 | Doerr et al. | 370/352 |
| 2005/0021691 A1* | 1/2005 | Ueno | 709/220 |
| 2005/0076228 A1* | 4/2005 | Davis et al. | 713/188 |
| 2005/0094565 A1* | 5/2005 | Brown et al. | 370/236.2 |
| 2005/0108397 A1* | 5/2005 | Basso et al. | 709/225 |
| 2005/0157723 A1* | 7/2005 | Kim et al. | 370/392 |
| 2005/0182865 A1* | 8/2005 | Sethi et al. | 710/22 |
| 2005/0195741 A1* | 9/2005 | Doshi et al. | 370/230 |
| 2005/0243858 A1* | 11/2005 | Vitebsky et al. | 370/447 |
| 2005/0289150 A1* | 12/2005 | Kudo | 707/10 |
| 2006/0005254 A1* | 1/2006 | Ross | 726/27 |
| 2006/0092841 A1* | 5/2006 | Lloyd et al. | 370/231 |
| 2006/0098675 A1* | 5/2006 | Okuno | 370/412 |
| 2006/0123083 A1* | 6/2006 | Goutte et al. | 709/206 |
| 2006/0146792 A1* | 7/2006 | Ramachandran et al. | 370/352 |
| 2006/0159129 A1* | 7/2006 | Schmidt | 370/493 |
| 2006/0165068 A1* | 7/2006 | Dalton et al. | 370/352 |
| 2006/0168033 A1* | 7/2006 | Cai et al. | 709/206 |
| 2006/0168281 A1* | 7/2006 | Starr et al. | 709/230 |
| 2006/0173989 A1* | 8/2006 | Lin | 709/223 |
| 2006/0182029 A1* | 8/2006 | Kealy et al. | 370/230 |
| 2006/0188080 A1* | 8/2006 | Terpstra et al. | 379/211.02 |
| 2006/0193322 A1* | 8/2006 | Jabbari et al. | 370/389 |
| 2006/0212931 A1* | 9/2006 | Shull et al. | 726/10 |
| 2006/0218399 A1* | 9/2006 | FitzGerald et al. | 713/168 |
| 2006/0230279 A1* | 10/2006 | Morris | 713/182 |
| 2006/0239257 A1* | 10/2006 | Banner et al. | 370/356 |
| 2007/0041527 A1* | 2/2007 | Tuchman et al. | 379/88.22 |
| 2007/0060124 A1* | 3/2007 | Kalavade | 455/433 |
| 2007/0116043 A1* | 5/2007 | MeLampy et al. | 370/466 |
| 2007/0130351 A1* | 6/2007 | Alperovitch et al. | 709/229 |
| 2007/0210894 A1* | 9/2007 | Park et al. | 340/5.2 |
| 2007/0269036 A1* | 11/2007 | Bates et al. | 379/212.01 |
| 2008/0016167 A1* | 1/2008 | Lund et al. | 709/206 |
| 2008/0037756 A1* | 2/2008 | Baumeister et al. | 379/218.01 |
| 2008/0104186 A1* | 5/2008 | Wieneke et al. | 709/206 |
| 2008/0120378 A2* | 5/2008 | Smith | 709/206 |
| 2008/0126553 A1* | 5/2008 | Boucher et al. | 709/230 |
| 2008/0219258 A1* | 9/2008 | Bowen et al. | 370/389 |

* cited by examiner

CONTROLLING ACCESS TO A HOST PROCESSOR IN A SESSION BORDER CONTROLLER

FIELD OF THE INVENTION

The present invention relates to controlling access to a host processor.

BACKGROUND

Voice over IP (VoIP) has emerged as a technology for carrying voice, video, and multimedia traffic over the Internet. A suite of VoIP protocols has evolved to cover many aspects of carrying calls over the Internet, including signaling, media transport, session routing, quality of service, and interfacing with the public switched telephone network (PSTN).

VoIP has become a target of denial of service (DoS) attacks, in which an attacker attempts to prevent legitimate users of a service from using that service. The ubiquitous and open nature of telecommunication networks, coupled with the importance of these networks, makes detection and prevention of denial-of-service attacks a priority for both network access and service providers. Some network infrastructure providers have responded by installing threat-specific router filters to lessen the exposure to certain denial-of service attacks. For example, the industry standard RFC 2827 describes a best practices solution for prohibiting denial-of-service attacks which use forged Internet protocol (IP) addresses propagated from behind an Internet service provider's aggregation point. Unfortunately, these threat-specific filters leave networks and network coupled resources open to new attacks.

Network managers can employ several techniques for reducing the threat of an attack. For example, disabling unused or unneeded network services, enabling quota systems within operating systems, and separating critical functions from other data partitions and volumes (i.e., separately mounted file systems with independent attributes). Some of these techniques limit the ability of an intruder to take advantage of available services but can result in an unintentional reduction in capability for legitimate network users. Other techniques, such as network monitoring, are labor intensive and subject to interpretation of what constitutes ordinary activity regarding data manipulation, CPU usage, and network traffic.

The signaling protocols used in VoIP are particularly vulnerable to DoS attacks. These protocols have relatively long timeouts, and a delay in responding to a request triggers a series of retries, one after the other, which only increases the traffic. Furthermore, parsing of signaling packets is time consuming, since these protocols are located relatively high up in the protocol stack. Thus, a common response to a DoS attack is to simply drop signaling packets at random during the attack.

Therefore, further improvements to systems and methods for preventing denial-of-service attacks are desired.

SUMMARY

An exemplary method for controlling access to a host processor comprises the steps of receiving a plurality of signaling packets and controlling access to a host processor, via a first and a second path, for at least a portion of the packets in accordance with a bandwidth limit for the respective path.

An exemplary system for controlling access to a host processor comprises: a host processor; and a traffic manager coupled to the host processor via a first path and a second path. The traffic manager is configured to communicate at least a portion of the packets to the host processor via a selected one of the paths. The traffic manager is further configured to regulate traffic along the first path such that the bandwidth limit of the first path is respected, and to regulate traffic along the second path such that the bandwidth limit of the second path is respected.

DESCRIPTION OF THE DRAWINGS

Many aspects of the invention can be better understood with reference to the following drawings. The components in the drawings are not necessarily to scale, emphasis instead being placed upon clearly illustrating the principles of the present invention.

DETAILED DESCRIPTION

In accordance with the present invention, the impact of DoS attacks is reduced by controlling access to a host processor in a session border controller. This method shifts the impact of the DoS attack from call endpoints in general to "untrusted" endpoints. Call endpoints are classified as trusted or untrusted (to be described later), and signaling packets from trusted endpoints receive preferential access to the host processor. The criteria used to promote endpoints from untrusted to trusted ensures that endpoints with already established calls or with recently completed calls, are relatively unaffected by a DoS attack. These endpoints are able to perform normal signaling activities, such as placing a call on hold, negotiating a codec, or terminating a call, even during a DoS attack. In contrast, signaling packets from untrusted users may be dropped during a DoS attack, and these untrusted calls may timeout at the signaling protocol.

Figure 1:
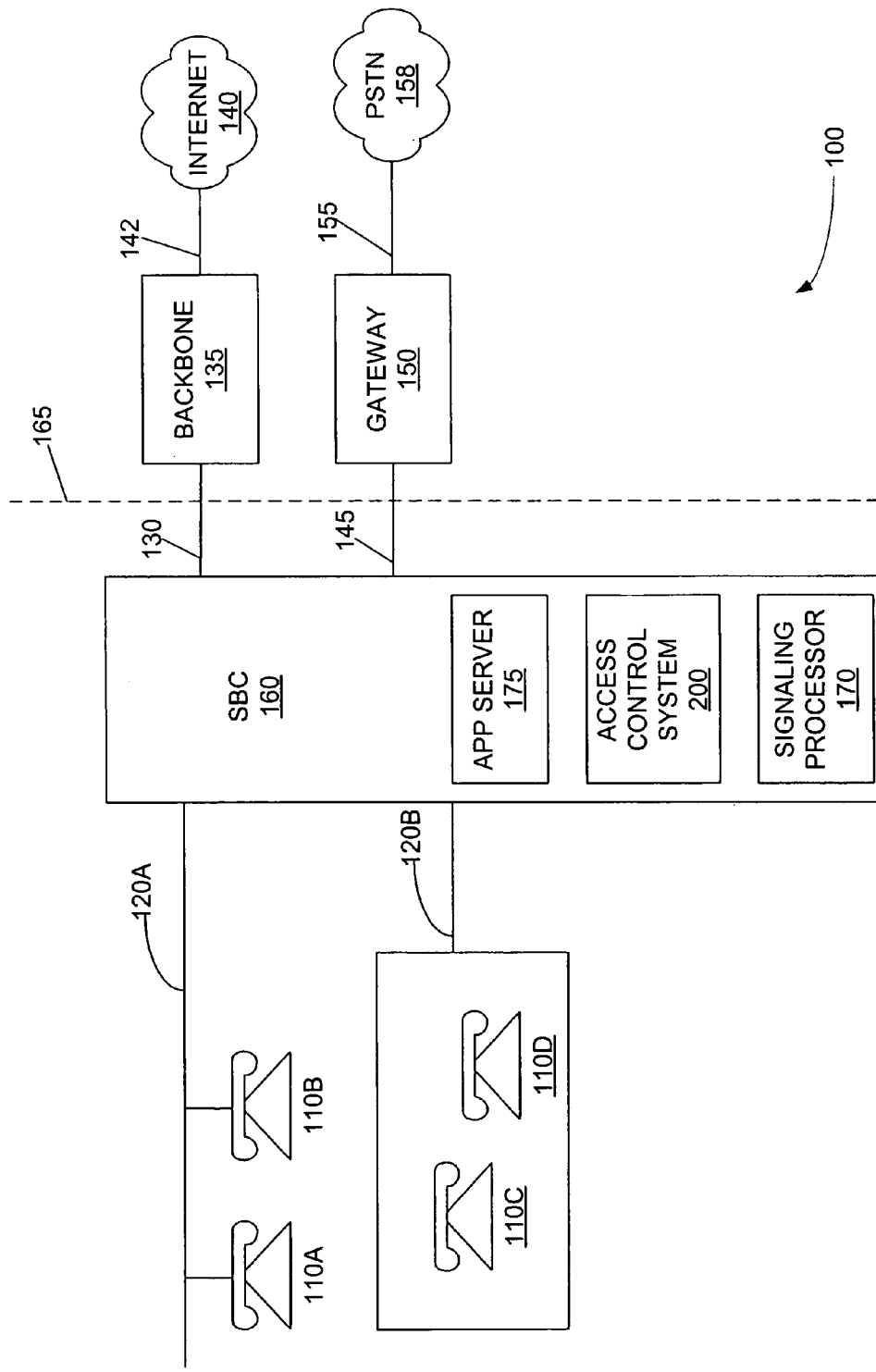
FIG. 1 is a block diagram of an example system environment that includes an access control system.

FIG. 1 is a block diagram of an example system environment that includes an apparatus for controlling access to a host processor, in accordance with the present invention. Network 100 is a converged network capable of carrying voice, video, and multimedia traffic as well as traditional data. In a preferred embodiment, the network 100 uses the IP protocol as a network layer protocol, and uses a combination of protocols generally known as Voice over IP (VoIP) to carry the voice, video, and/or multimedia traffic over the network layer.

Users in communication with the network 100 can make and receive calls (voice, video, and/or multimedia) using the facilities of the network 100. Each call includes a stream of VoIP packets traveling over the network 100. A call includes signaling packets and media packets. Signaling packets are used to establish (set up) and terminate (tear down) a call. Once the call is established, media packets carry the voice, video, and/or multimedia. In the remainder of this description, the term "endpoint" or "signaling endpoint" or "call endpoint" will be used to refer to the system through which the user places or receives the call.

In the example embodiment of FIG. 1, the network 100 is operated by an Internet service provider (ISP), and the users referred to above are subscribers or customers of the ISP. These subscribers (110A-D) are in communication with the network 100 through one or more access networks (120A, 120B). Various technologies can be used to implement the access networks. In this example, access network 120A employs digital subscriber loop (DSL), while access network 120B uses a T1 connection. Other access network technologies include hybrid fiber coax cable, and various wireless standards promulgated by the Institute of Electrical and Electronics Engineers (IEEE), such as IEEE 802.11.

A network device known as a session border controller (SBC) 160 is located at a border 165 of the network 100, separating the network 100 from an Internet 140 and a public switched telephone network (PSTN) 158. When an endpoint 110 places or receives a call, the stream of packets making up the call transits through the SBC 160. SBC 160 communicates over a link 130 to a backbone 135. Backbone 135 is in communication with the Internet 140 over link 142. SBC 160 communicates over a link 145 to a gateway 150, which communicates over a link 155 with the PSTN 158.

The fact that all signaling and media packets pass through the SBC 160 allows the SBC 160 to provide a number of services, including, but not limited to, routing of media packets and signaling packets based on present rules and policies, protocol conversion and codec transcoding, firewall and network address translator (NAT) traversal, quality of service (QoS) enforcement, and topology hiding. These functions are implemented by one or more application servers 175 running on the SBC 160, with the code making up the application servers running on one or more processors residing in the SBC 160.

An application server 175 running on the SBC 160 executes code on a host processor 130. This application server code modifies addresses inside signaling packets to ensure that all signaling packets involved in a call will pass through the SBC. (This process of address modification is further described in U.S. Patent Publication No. 20020112073, entitled "System and Method for Assisting in Controlling Real-Time Transport Protocol Flow through Multiple Networks via Media Flow Routing"). Since host processor 130 examines and modifies signaling packets, it may also be referred to as a signaling processor, or a host signaling processor.

Since all calls transmit the SBC 160, the SBC 160 is a prime candidate for denial of service (DoS) attacks. A DoS attack against a SBC typically involves an attacker 140 sending a flood of signaling packets (185) to the SBC 160. Without DoS protection, the host processor 130 is likely to be overrun with packets and therefore unable to process the signaling packets associated with calls. When this overrun occurs, an unprotected SBC 160 does not distinguish between calls, so that calls are equally likely to be affected by a DoS attack. In contrast, the access control system 200 and associated method described herein shifts the impact of the DoS attack to a subset of calls.

Figure 2:
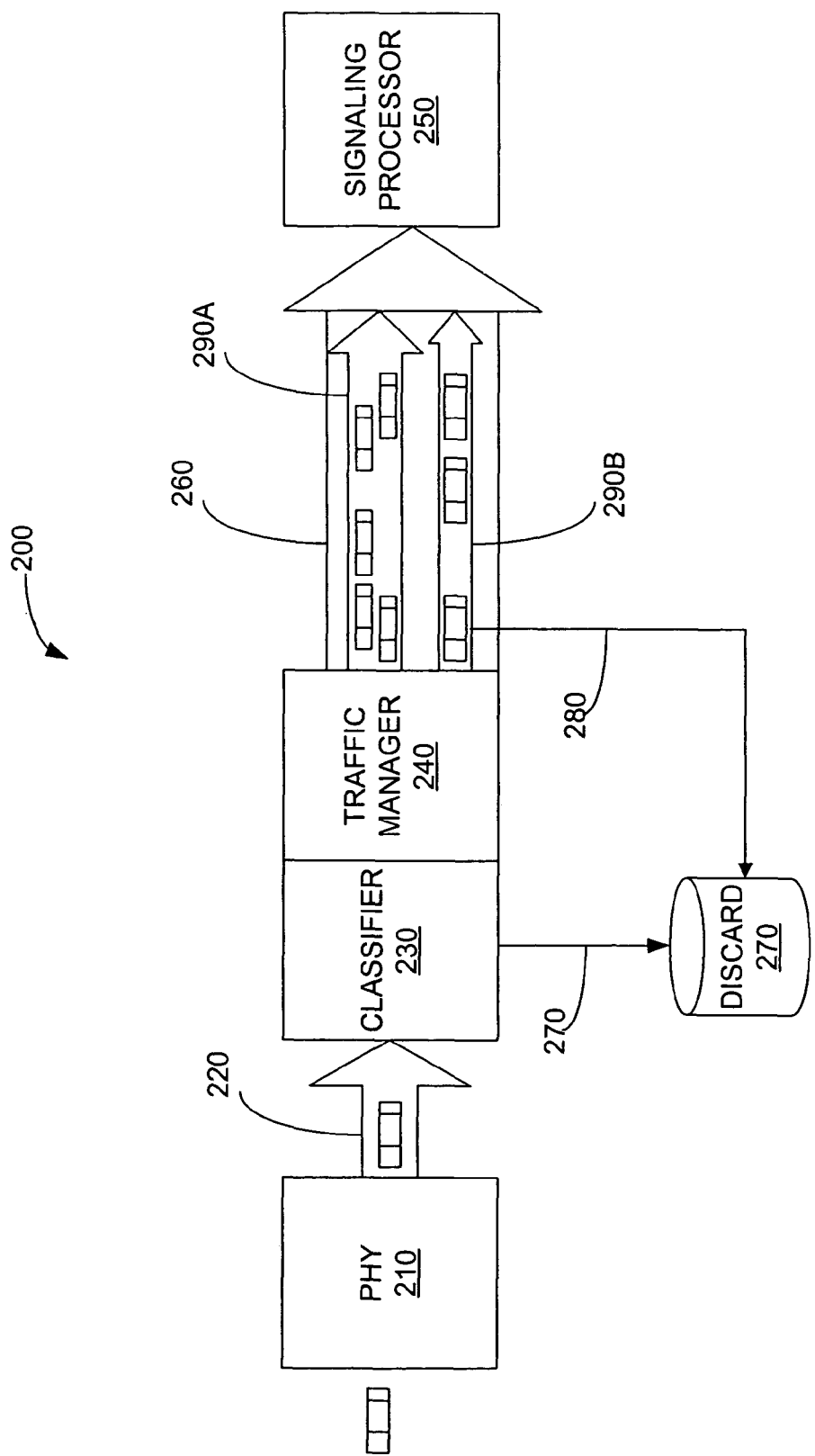
FIG. 2 is a block diagram of an example access control system.

A high level description of the access control system 200 will be described with reference to FIG. 2. Signaling packets enter the SBC 160 through a network interface 210, also known as a physical layer device (PHY). Upon arrival, packets initially travel on a fast path 220 from the network interface 210 to a classifier 230 and a traffic manager 240. Access to the host processor 130 is via a slow path 250, and the slow path 250 is controlled by the classifier 230 and the traffic manager 240.

Utilizing one aspect of the access control system 200, the classifier 230 denies some signaling packets (shown on path 260) access to the slow path 250, so these packets do not reach the host processor 130. Denied packets may be dropped or may be stored in a discard area 270 for further analysis. Another aspect of the controlling access to a host processor involves the traffic manager 240 controlling the bandwidth of the slow path 250 so that some signaling packets are dropped (shown on path 280) to avoid exceeding the bandwidth limit. The total limit for the slow path 250 is configured by a system administrator. In a preferred embodiment, the slow path 250 is subdivided into multiple sub-paths 290, and bandwidth on sub-paths can be independently limited by the system administrator. (Regulation of slow path bandwidth will be described in more detail later in connection with FIGS. 5 and 8.)

The fast path 220 is so named because the component(s) making up this path (e.g., the classifier 230 and the traffic manager 240) are designed to handle packets at line speed. The fast path 220 is also known as the data path. The slow path 250 is so named because the host processor 130 typically operates at a speed which is typically orders of magnitude slower than the components of the fast path 220. The slow path 250 is also known as the host path or the control path.

Although the fast path 220 and the slow path 250 are logically separate, in a preferred embodiment both paths are implemented by a switching fabric. Prior art designs use a switching fabric to route packets between ingress network elements and egress network elements, along with a traffic manager to control access to (and thus bandwidth on) the switching fabric. This technique, when implemented in a network device, can provide quality of service (QoS) for various types of packet streams as they pass through the network device. In contrast, in the system described in the present application, a traffic manager is used to regulate bandwidth of a path to a host processor, rather than to an egress element.

In one example embodiment, the classifier 230 is implemented by a network processor such as the AMCC nP7250, and the traffic manager 240 is implemented as an application-specific integrated circuit (ASIC) such as the AMCC nPX5700 chipset. In another embodiment, the classifier 230 could also be implemented as an ASIC. Other contemplated embodiments for the classifier 230 and the traffic manager 240 include field-programmable gate arrays (FPGAs) and reconfigurable processors.

Figure 3:
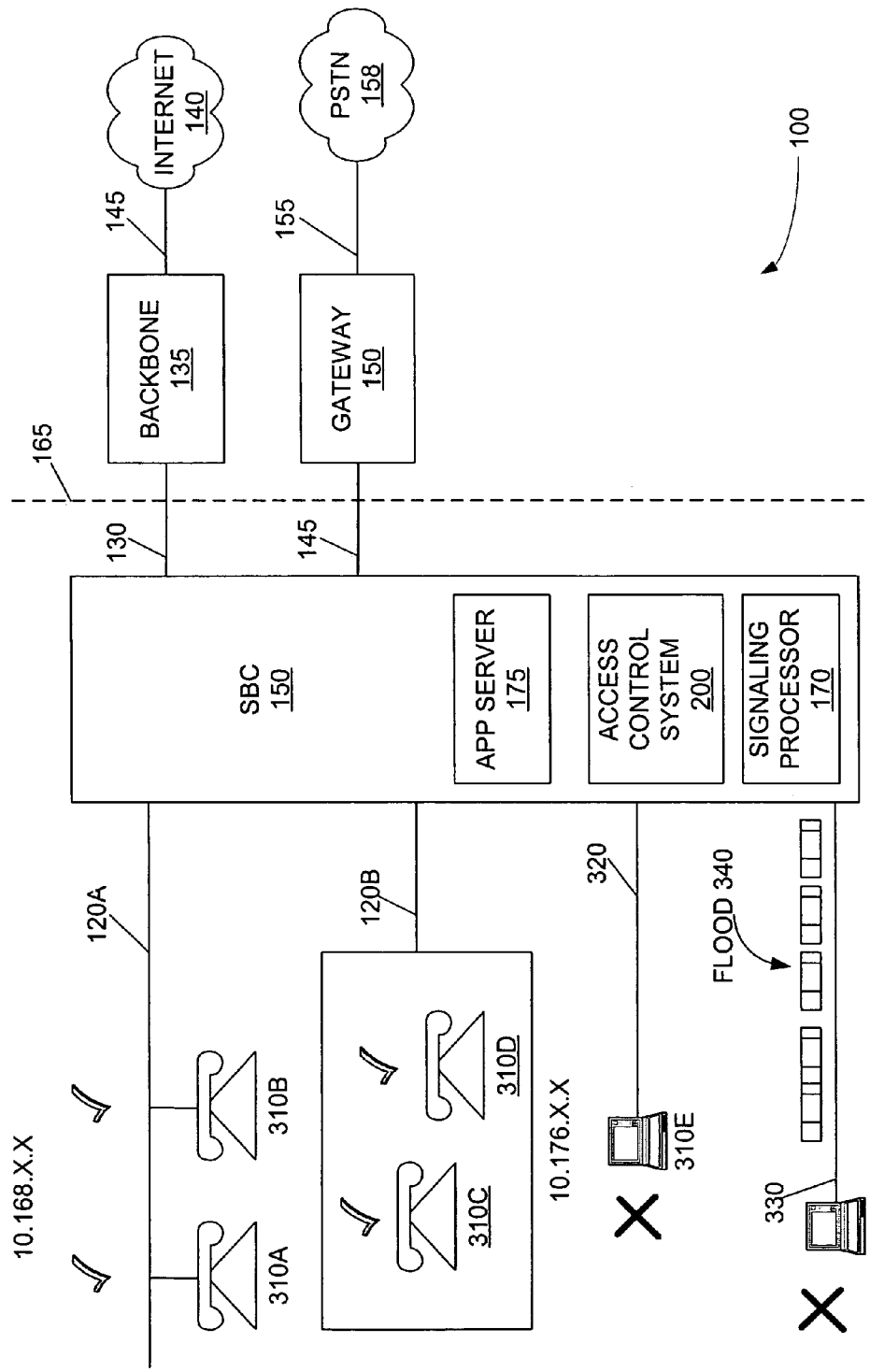
FIG. 3 is a block diagram of the network of FIG. 1, illustrating how the classifier of FIG. 2 determines when to drop packets.

FIG. 3 is a block diagram of the network 100 including the SBC 160, illustrating how the classifier 230 determines when to drop packets. A system administrator for the network 100 provisions the SBC 160 with a list of authorized subscribers to the VoIP service offered by network 100. Each subscriber is identified by an IP address. The IP address may be a partial IP address, using a netmask to specify a subnet. In that case, multiple subscribers are identified by the partial IP address. When an endpoint such as 110 places or receives a call, the endpoint 110 sends a signaling packet to the SBC 160. The classifier 230 checks the source address of this signaling packet against the list of authorized subscribers.

Endpoints 310A-D are authorized subscribers with access to the network 100 through the access network 120A and the access network 120B. Because these subscribers are authorized, signaling packets from these authorized endpoints 310A-D pass the initial check. However, the unauthorized user 310E, with access through the link 320, is not in the list of authorized subscribers, so signaling packets from the user 310E are dropped on the initial check.

In the example of FIG. 3, the attacker 310G has access through the link 330. The attacker 310G has "cloned" or "spoofed" the IP address of an authorized user, which allows the attacker 310G to gain entry to the network 100 and then mount a DoS attack by sending a large volume of signaling packets (shown as 340) to the network 100. Since the attacker 310G is using an authorized address, some number of signaling packets from the attacker 310G pass the initial check and are delivered via the slow path 250 to the host processor 130.

Advantageously, another aspect of the access control system 200 allows the host processor 130 to determine that the activity of the attacker 310G is suspicious or malicious. Upon such a determination, the host processor 130 adds the IP address of the attacker 310G to a list of denied users. This denied list also used by the classifier 230 in determining whether to drop a packet: a source endpoint must be included in the authorized list and not included in the denied list, otherwise the packet is dropped. As with the authorized list, addresses in the denied list may be partial IP addresses with associated netmasks, so that a particular address in the denied list may represent more than one endpoint in the same subnet. In a preferred embodiment, a single endpoint is on only one of the two lists. But since these lists can include subnets, an endpoint can belong to a subnet that is on the authorized list, and the endpoint itself can simultaneously be on the denied list (e.g., authorized list includes 10.10.10.X and denied list includes 10.10.10.12).

Returning now to FIG. 2, the slow path 250 includes two sub-paths: a trusted path 290A and an untrusted path 290B. Packets from trusted endpoints travel to the host processor 130 along the trusted path 290A, while packets from untrusted endpoints travel along the untrusted path 290B. (Trusted and untrusted endpoints will be discussed in more detail in connection with FIG. 4.) As explained earlier, the slow path 250 has a total bandwidth limit which is enforced by the traffic manager 240. The trusted path 290A and the untrusted path 290B share the total bandwidth of the slow path 250. In order to protect the host processor 130 from being overrun with packets from untrusted endpoints, the trusted path 290A is allocated a larger share of the total bandwidth than the untrusted path 290B, precisely because those packets were received from trusted endpoints.

Figure 4:
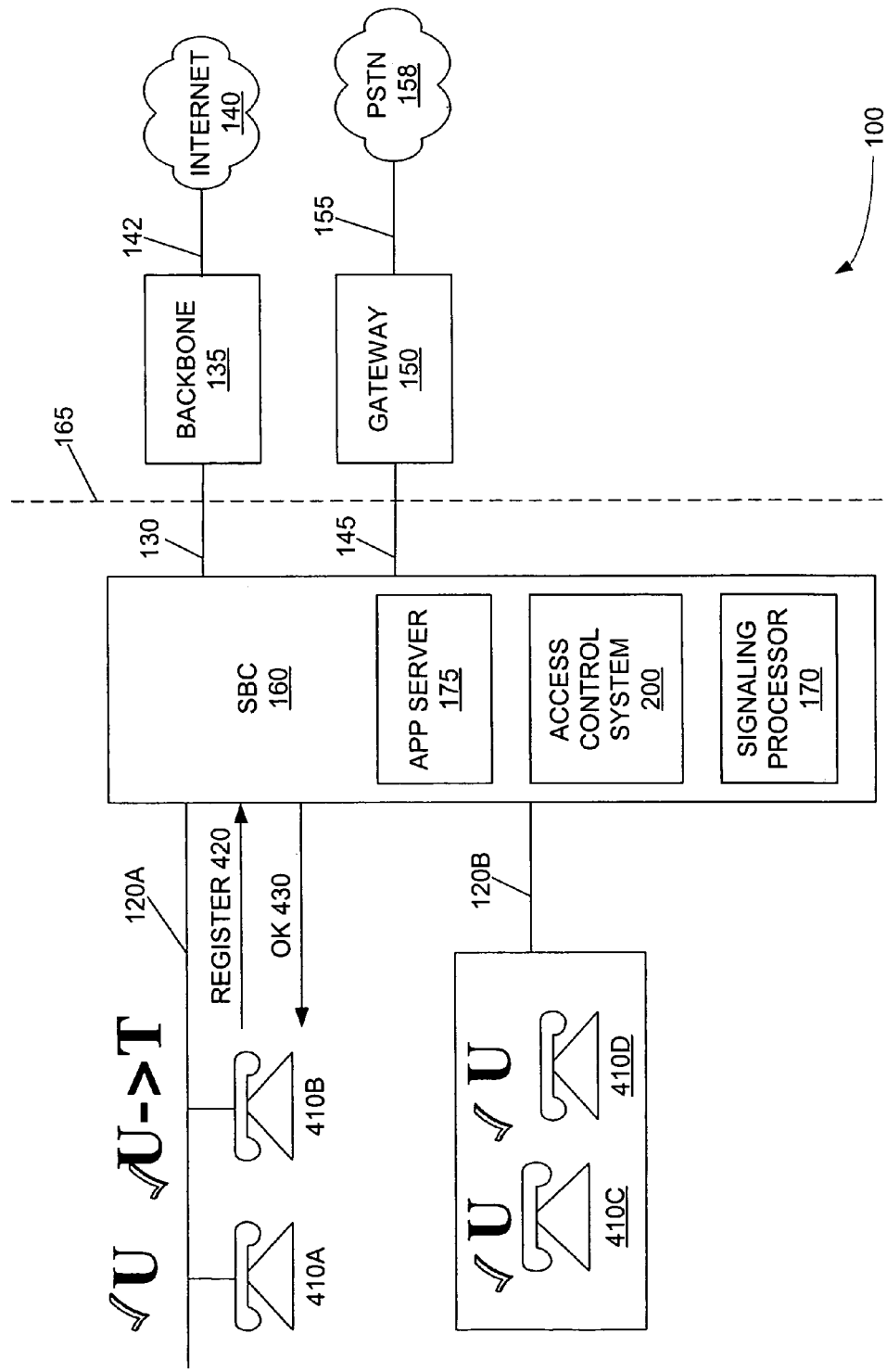
FIG. 4 is a block diagram of the network of FIG. 1, illustrating trusted and untrusted endpoints.

FIG. 4 is a block diagram of the network 100 including the SBC 160, illustrating a trusted endpoint 410B and untrusted endpoints 410A, 410C, and 410D. A signaling endpoint is classified as untrusted until the endpoint is promoted by the SBC 160 to trusted, based on the endpoint's signaling behavior. An endpoint is promoted to trusted when the endpoint has established an open dialogue with an application server residing in the SBC 160, so that the endpoint has either been authenticated by the application server, or has established one side of the call setup.

In FIG. 4, authorized subscriber endpoints 410A, 410C and 410D have not yet been promoted, so are untrusted. Endpoint 410B (an authorized subscriber) establishes a dialog with the application server 175 (FIG. 1) prior to placing or receiving a call. In the SIP protocol used by this example, the dialog is established by sending a Registration message (420) to SBC 160, which is processed the application server 175. This registration may involve authentication and possibly an additional challenge-response. Endpoint 410B then receives a promotion to trusted (430) after successful registration. In the normal course of events, a trusted endpoint 410B is demoted to untrusted after a period of signaling inactivity. A demotion to untrusted may also result from suspicious signaling behavior.

Figure 5:
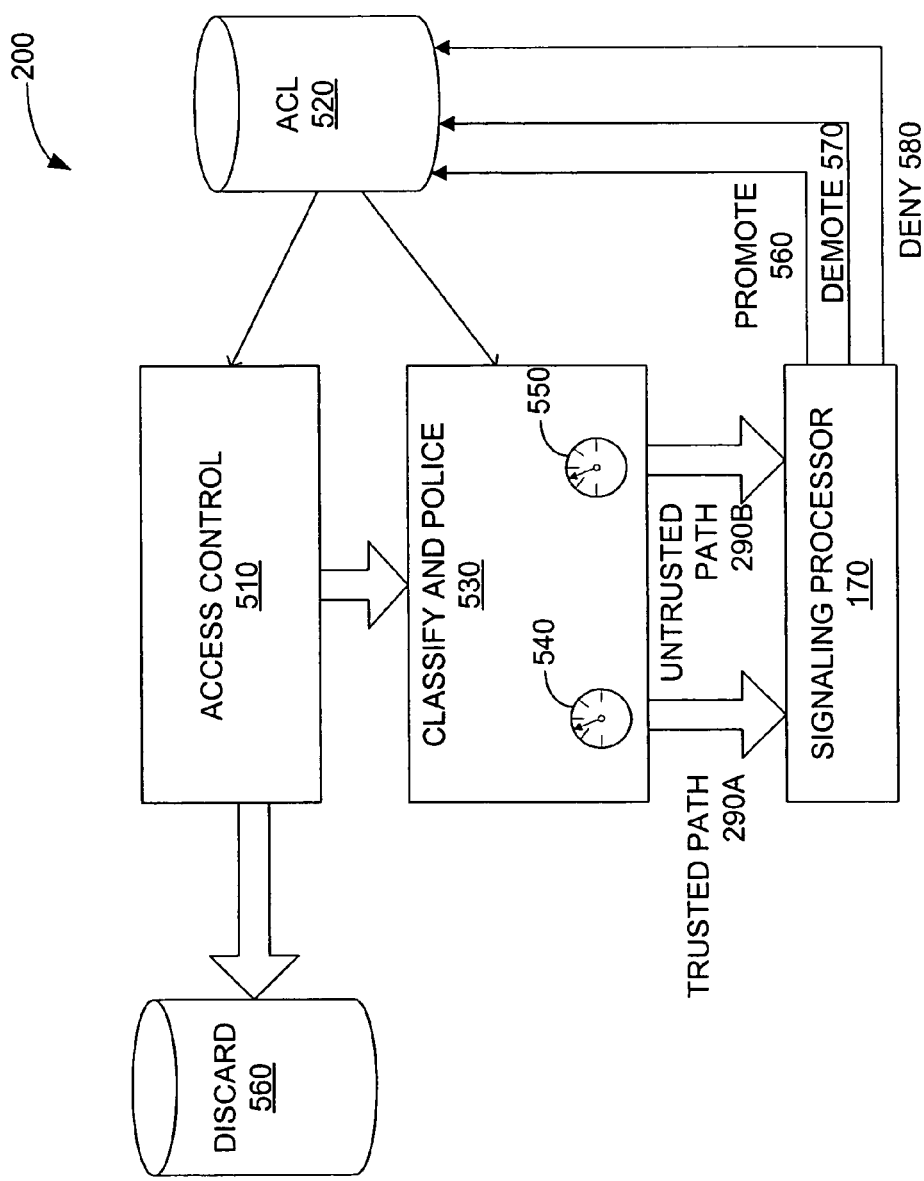
FIG. 5 is a diagram of a method for controlling access to a host processor.

The mechanism described above that controls access to the slow path 250 can be viewed as comprising multiple levels of protection, shown in FIG. 5. A particular embodiment may utilize any one of the protection levels, or any combination of the protection levels. The example embodiment of FIG. 5 uses two levels of protection. A first level of protection (an access control 510) permits or denies incoming packets access to the slow path 250, based on information in the packet header. In a preferred embodiment, the source endpoint (i.e., IP address and/or source TCP/UDP port number) is compared to endpoints in an access control list (ACL) 520. The ACL 520 can be structured in various ways. A preferred embodiment (described earlier in connection with FIG. 3) uses two ACLs: a "whitelist" contains endpoints that are permitted access to the slow path 250; and a "blacklist" contains endpoints that are denied access to slow path 250. Only those packets found in the whitelist but not in the blacklist are permitted access to the slow path 250.

In another embodiment, a single ACL whitelist contains endpoints that are permitted access to the slow path 250, and all other packets are denied. In yet another embodiment, a single ACL blacklist contains endpoints that are denied access to the slow path 250, and all other packets are granted access.

Other header fields, for example, the Ethernet type or IP protocol type, can also be used in the decision to permit or deny access. In one preferred embodiment, the classifier 230 classifies each ingress packet into ARP, IP-UDP, IP-TCP, and ICMP. In a preferred embodiment, ARP Request packets are granted access and some ICMP packets are granted access, based on the type of ICMP message.

Packets that are granted initial access encounter a second level of protection (530). The second level of protection (530) uses the ACL 520 to classify packets as trusted or untrusted. Once packets are classified, the classifier 230 and the traffic manager 240 cooperate to place trusted packets on the trusted path 290A, and untrusted packets on the untrusted path 290B.

The second level of protection (530) also uses traffic policies (540, 550) to regulate or police the bandwidth of trusted path 290A and untrusted path 290B. The trusted path 290A and the untrusted path 290B are each associated with one of the traffic policies (540, 550) which define traffic parameters for packets traveling along the respective sub-path. Before routing a packet onto one of the two sub-paths, the traffic manager 240 determines if placing the packet on the sub-path would violate the policy associated with that sub-path. If placement would result in a violation, the traffic manager 240 does not place the packet on the sub-path. Instead, the packet that would cause the violation is discarded, or routed to another component 560 for storage and/or analysis.

The traffic policies for the trusted path 290A and the untrusted path 290B are defined by a SBC system administrator. In a preferred embodiment, trusted path and untrusted path traffic policies are defined as follows. The administrator defines a MaxSignalingBandwidth setting which represents the maximum bandwidth of the slow path 250. The administrator also defines MinUntrustedSignaling and MaxUntrustedSignaling settings which represent untrusted bandwidth as a percentage of MaxSignalingBandwidth. MinUntrustedSignaling is guaranteed bandwidth for the untrusted path 290B, while MaxUntrustedSignaling is an upper limit for the untrusted path 290B. However, bandwidth above minimum is available to the untrusted path 290B only if the bandwidth is not in use by the trusted path 290A.

Packets that arrive at the host processor 130 on the slow path 250 are examined by the host processor 130. The contents of these signaling packets are used to update the ACL 520. As explained earlier in connection with FIG. 4, signaling packets determine when an endpoint is promoted to trusted status. More specifically, an endpoint's entry in the ACL 520 is updated on a promotion event (570) so that a future look-up by the classifier 230 determines that the endpoint is trusted. Saying an endpoint is trusted is equivalent to saying that packets received from that endpoint are classified as trusted.

An endpoint's entry in the ACL 520 is updated upon a demotion event (580) so that a future look-up by the classifier 230 determines that the endpoint is untrusted. Saying an endpoint is untrusted is equivalent to saying that packets received from that endpoint are classified as untrusted. In a preferred embodiment, a demotion event automatically occurs some period of time after the promotion event. In this manner, entries for trusted endpoints are aged, so that a trusted endpoint which is not actively signaling becomes untrusted.

Host processor 130 also detects signaling packets that appear to be either malicious or suspicious in some way. The host processor 130 updates the ACL 520 to deny access to an endpoint sending suspicious or malicious signaling packets. For example, access could be denied to an endpoint sending invalid signaling packets at a suspiciously high rate. (Denying access to an endpoint means denying access to packets received from that endpoint.) In a preferred embodiment, access is denied (shown as 590) by adding the endpoint to a "blacklist" (discussed earlier in connection with FIG. 3.)

Figure 6:
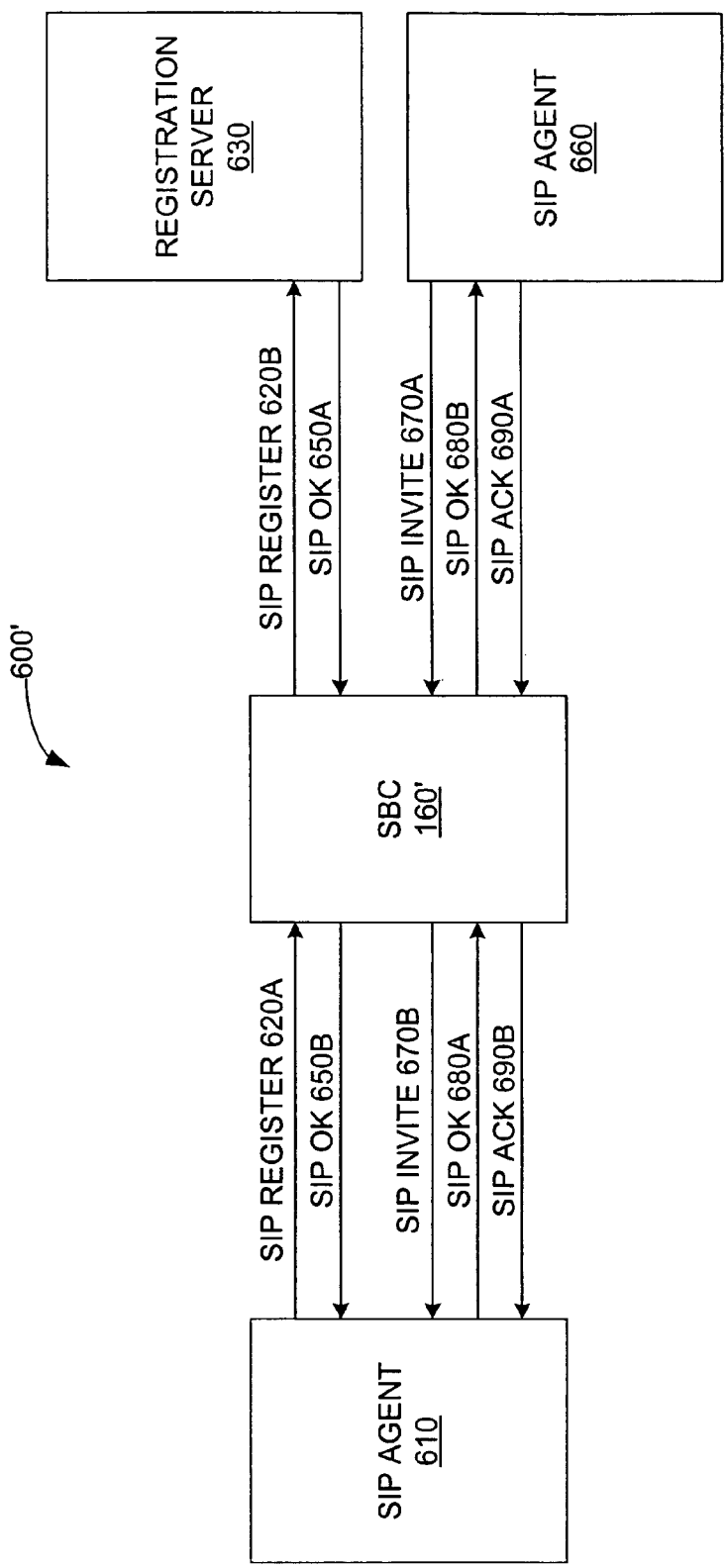
FIG. 6 illustrates call signaling activity and related promotion and demotion events in one example embodiment of the access control system.

FIG. 6 illustrates call signaling activity and related promotion and demotion events 600' in one embodiment of the access control system 200. This embodiment uses Session Initiation Protocol (SIP) as a call signaling protocol. An agent 610 uses a SIP Register message 620 to inform a registration server 630 of the current location of agent 610. (Note that the agent 610 refers to a particular signaling endpoint defined by an IP address and possibly a port number). SBC 160' acts as a SIP proxy server: both sides talk to the proxy server, and the proxy server forwards call-related packets to the other side.

The Register message is first sent from the agent 610 to the SBC 160' as message 620A. The message is then forwarded from the SBC 160' to the registration server 630 as message 620B. In this example, we will assume that Register message 620A is the first signaling message that the SBC 160' has received from the endpoint agent 610. Therefore, the agent 610 is untrusted on receipt of the Register message 620A, and the Register message 620A is routed to the host processor 130 on the untrusted path 290B.

If the registration is successful, then the registration server 630 replies with a SIP OK message. The SIP OK message is first sent from the registration server 630 to the SBC 160' as message 640A. The SBC 160' treats the receipt of the SIP OK message (640A) as a promotion event for the endpoint agent 610: the ACL 520 is updated so that the endpoint agent 610 becomes trusted. The SBC 160' also forwards the SIP OK message (as message 640B) on to the agent 610.

A second agent 650 initiates a call to the agent 610 through a SIP Invite message 660. As before, the message is first sent from the agent 650 to the SBC 160' (as message 660A), then forwarded from the SBC 160' to the agent 610 (as message 660B). The agent 610 accepts the call by sending an OK message (670A and 670B). However, the call setup is not complete until the originator (agent 650) sends an ACK message 680.

On receipt of the ACK message 680, the SBC 160' promotes both sides of the call, agent 650 and agent 610, to trusted. The agent 610 is already trusted (upon registration) but the promotion moves the agent 650 from untrusted to trusted. Note that registration is an optional feature of SIP. If the agent 610 had not registered before the agent 650 originated the call, then the promotion on receipt of the ACK message 680 moves the agent 610 from untrusted to trusted.

Figure 7A:
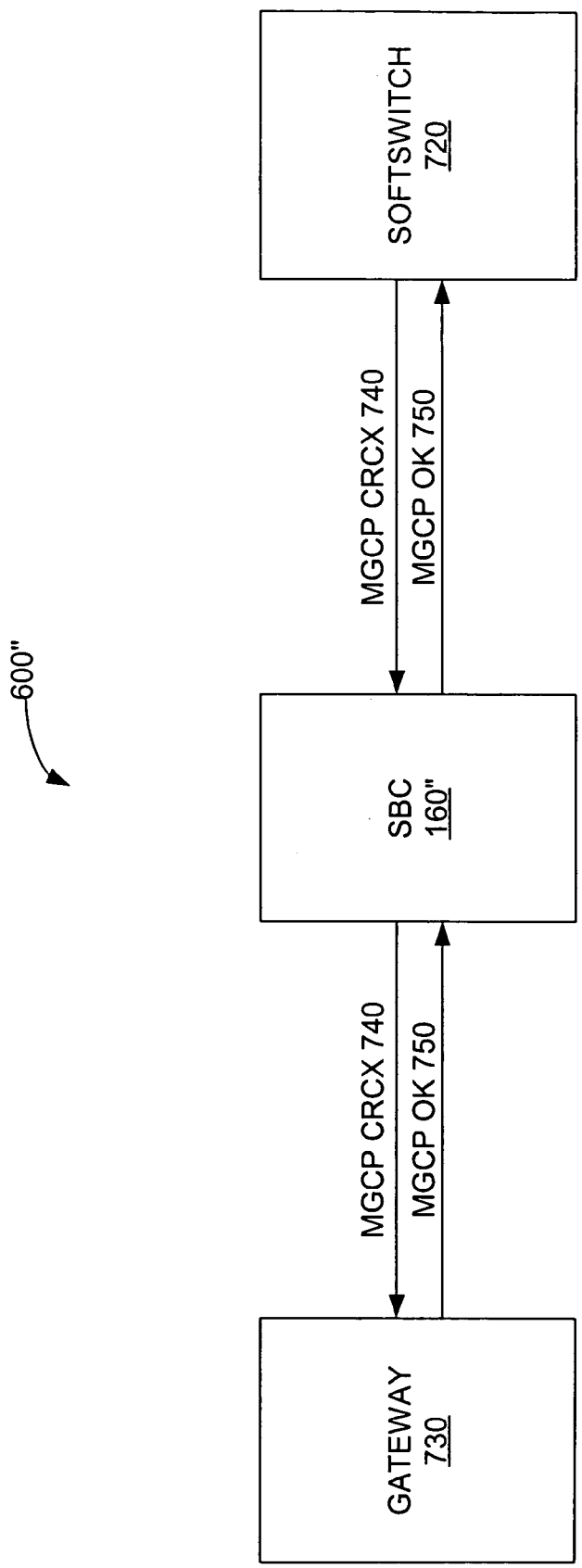
FIG. 7 illustrates call signaling activity and promotion/demotion events in another example embodiment of the access control system.
Figure 7B:
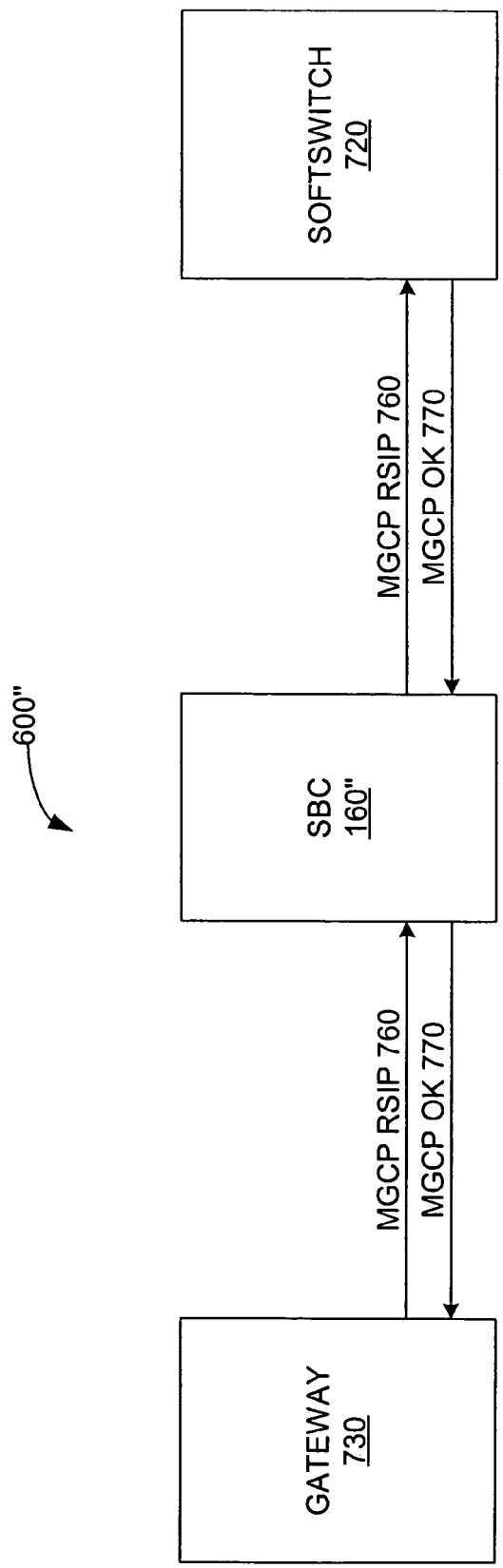

FIGS. 7A and 7B illustrate call signaling activity and related promotion and demotion events 600" in another embodiment of the access control system 200. The embodiment of FIGS. 7 and 7B uses Media Gateway Control Protocol (MGCP) as a signaling protocol. The SBC 160" acts as an intermediary between a softswitch 710 and a gateway 720. Not shown in the diagram are the user endpoints of the call, or other signaling messages exchanged between one endpoint and the gateway, and between the other endpoint and the softswitch. In this configuration, SBC 160" appears to be a gateway on one side of the call, and appears to be a call agent on the other side of the call.

We will again assume that both the softswitch 710 and the gateway 720 start out as untrusted. When the call has proceeded through initial signaling stages (not shown), the media path is ready to be established between the two call endpoints. At this time, the softswitch 710 notifies the gateway by sending a MGCP Create Connection (CRCX) message (730). Since the SBC 160" is acting as a proxy, the CRCX message is first sent to the SBC 160", and then forwarded to the gateway 720. The gateway 720 responds with a positive acknowledgement (740), which is first received by the SBC 160", then forwarded to the softswitch 710. On receipt of the acknowledgement, the SBC 160" promotes the gateway 720 to trusted. The softswitch 710 is promoted when the SBC 160" receives the first MGCP RSIP acknowledgement. If the Softswitch 710 is demoted after that (e.g., a timeout occurs, the list was full, etc.), it is promoted again when the SBC 160" receives any signaling message from the call agent (e.g., CreateConnection, AuditEndpoint, NotificationRequest, acknowledgement to a Notify, etc.).

FIG. 7B illustrates a second promotion scenario. When endpoints under the control of the gateway 720 go in-service, the gateway 720 notifies the softswitch 710 using a MGCP Restart In Progress (RSIP) message (750). The SBC 160 intercepts the RSIP message 760 from the gateway 720 and forwards it to the softswitch 710. The softswitch 710 responds by acknowledging (shown as 760) the RSIP message 760. The SBC 160 intercepts the acknowledgement 770 from the softswitch 710 and forwards it to the gateway 720. On receiving the RSIP message 760, the SBC 160" promotes both the gateway 720 and the softswitch 710 to trusted.

Figure 8:
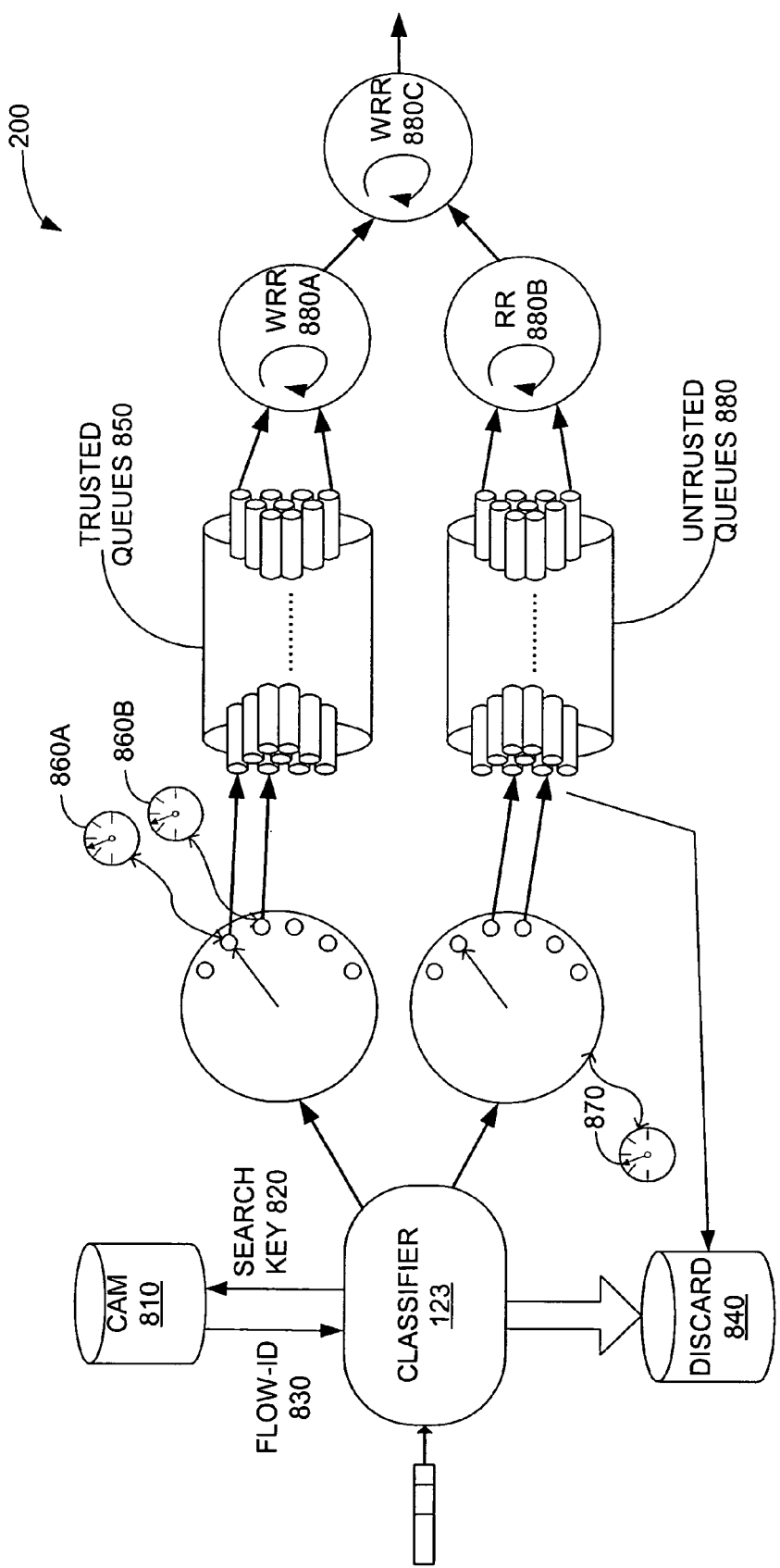
FIG. 8 is a block diagram of packet flow through an example embodiment of the present invention.

FIG. 8 is block diagram of the packet flow through SBC 160 in accordance with an example embodiment of the present invention. As discussed earlier in connection with FIG. 5, the classifier 230 provides one grant/deny level of protection (510) for the slow path 250 using an access control list. In a preferred embodiment, the ACL 520 is implemented by a CAM 810. At a high level of abstraction, the CAM 810 provides functionality similar to a database: the CAM 810 stores records, and given a search key, returns a record matching the key. This process of searching the CAM 810 is known as a "look-up."

The classifier 230 uses the CAM 810 to implement grant/deny protection as follows. The classifier 230 examines the header of received packet and uses one or more header fields to create a search key 820. In the preferred embodiment, the search key 820 describes source and/or destination endpoints and contains the following header fields: <Source IP Address> <Destination IP Address> <IP Protocol> <Source Port> <Destination Port>.

The classifier 230 provides the search key 820 to the CAM 810. The contents of CAM 810 are then searched for a match. If more than one match is found, the CAM 810 returns the best match 830. The match 830 contains data which allows the classifier 230 to determine whether or not the received packet is granted access to the slow path 250. If the packet is denied, the packet is either discarded, or marked and sent to another component (840) for storage and/or analysis.

Another level of protection (530) is policing bandwidth of the slow path 250. At a high level, the policing process can be viewed as follows. Incoming packets are classified, then placed on a queue (e.g., queue 860) and scheduled for transmission to the host processor 130 via the trusted path 290A or the untrusted path 290B. Each queue 860 is associated with a traffic policy (e.g., policy 910 in FIG. 9) which determines the timing and rate at which packets are removed from one of the queues and placed onto the associated sub-path. In a preferred embodiment, a traffic policy 910 has three parameters: initial burst (in bytes); initial burst (in seconds); and sustained rate (bytes/sec). If inserting a particular packet onto a sub-path would cause a violation of the associated traffic policy, then the traffic manager 240 either discards the packet or marks it as a violation and sends the packet to another component for storage and/or analysis. The use of traffic policies thus serves to regulate the bandwidth of the slow path 250.

The mechanism by which packets are classified then associated with a queue and a traffic policy will now be explained. The classifier 230 uses the CAM 810 to classify packets as trusted or untrusted. The classification is based on the source endpoint of the packet, which is found in the packet header. The classifier 230 looks up the source endpoint in the CAM 810, and the matching record 830 tells the classifier 230 whether the packet is trusted or untrusted.

Figure 9:
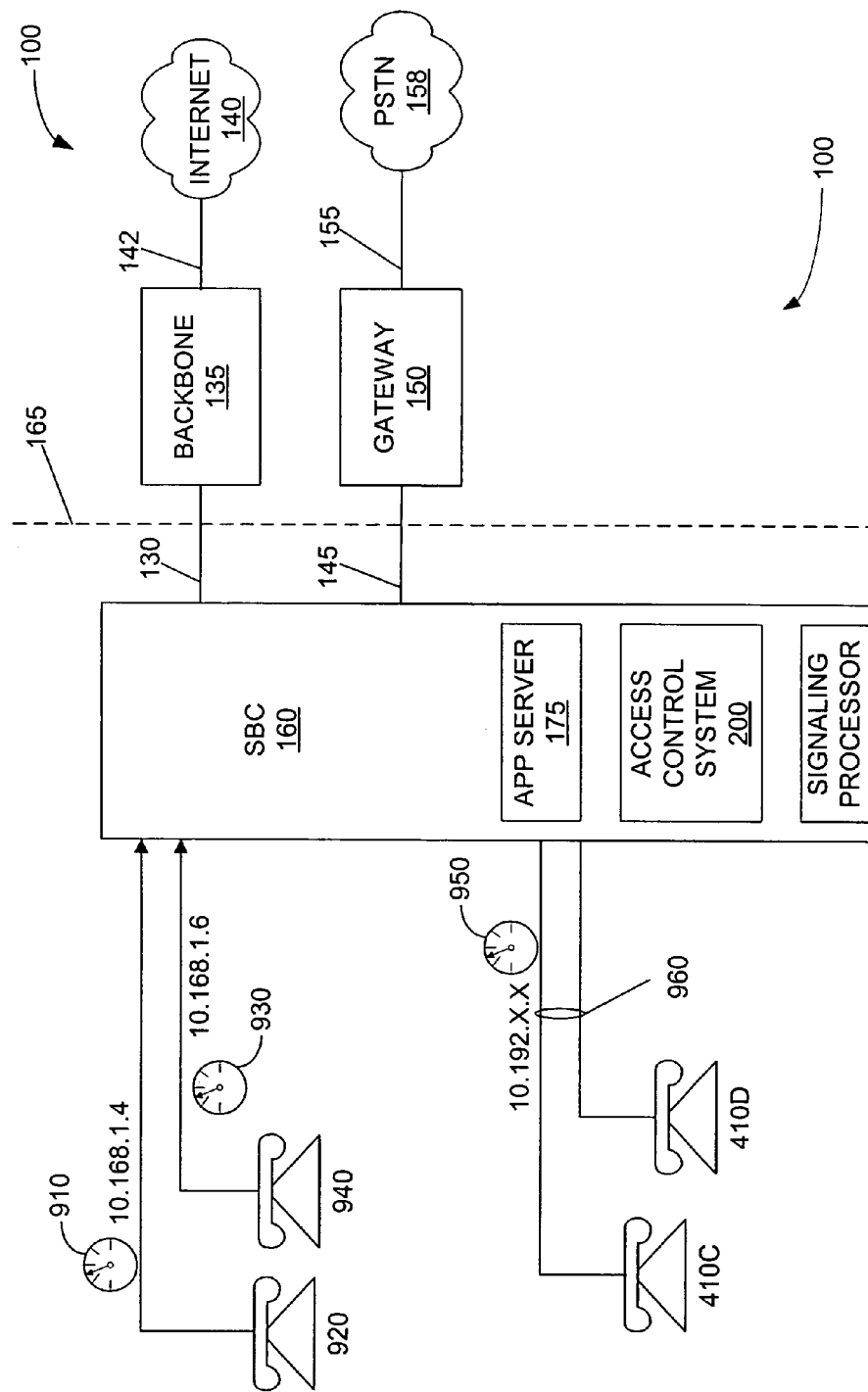
FIG. 9 is a block diagram of the network of FIG. 1, illustrating the use of traffic policies and flows on the trusted path of FIGS. 2 and 8.

In a preferred embodiment, the trusted path 290A is itself made of individual sub-paths which are independently policed. FIG. 9 is a block diagram of the network 100 including the SBC 160, illustrating the use of traffic policies and flows on the trusted path 290A. A system administrator for the SBC 160 may define a traffic policy 910 to be applied to an endpoint, or a group of endpoints, once the endpoint(s) becomes trusted. A single endpoint is identified by an IP address and TCP/UDP port number, while a group of endpoints is identified by an IP address using wildcards (i.e., a netmask), with an optional port number.

In the example of FIG. 9, three traffic policies are defined: a traffic policy 910 is associated with single endpoint 920 (IP address 10.168.1.4, any port), a traffic policy 930 is associated with single endpoint 940 (IP address 10.168.1.6, any port), and a traffic policy 950 is associated with the group of endpoints 960, identified by IP address 10.192.X.X. In this preferred embodiment, a traffic policy associated with a trusted sub-path has three parameters: initial burst (in bytes); initial burst (in seconds); and sustained rate (bytes/sec).

Note that traffic policies apply only to signaling packets, and not to media packets. Thus, these parameters are not related to the quality of service associated with the call itself, only with the establishment and tear-down of the call.

Packets received from the same endpoint are said to belong to the same "flow," and the same traffic policy is applied to packets in a flow. Thus, packets from the endpoints 920 are part of a first flow associated with the traffic policy 910, and packets from the endpoint 940 are part of a second flow associated with the traffic policy 930. However, a particular flow may contain packets from more than one endpoint. That is, the relationship between endpoint and flow is many-to-one. In the example of FIG. 9, packets from any endpoint in the group 960 are part of a third flow associated with the traffic policy 950.

When the classifier 230 looks-up an endpoint in the CAM 810, multiple pieces of data are returned: indication of grant/deny; indication of trusted/untrusted; and flow-id. In a preferred embodiment, the flow-id encodes multiple types of information, for example, a particular flow-id is used for "access denied," a first range of values is used for trusted flows, and a second range of values is used for untrusted flows.

Returning to FIG. 8, once the classifier 230 has classified a received packet into a particular flow with a flow-id, the packet is either buffered in a queue or discarded (850) before queuing. The discard algorithm uses a combination of factors, such as availability of space in the queue and priority. Well known discard algorithms include random early detection (RED) and weighted random early detection (WRED).

A packet received from a trusted endpoint has a flow-id unique to that flow. The unique flow-id is used to assign packets in that trusted flow to one of a set of trusted queues 860. Each trusted flow has its own trusted queue. The flow-id for a trusted flow also determines a traffic policy (870A, 870B) for that flow. Packets received from each trusted endpoint are thus identified by a flow-id, buffered in a queue specific to this flow-id, and policed according to a traffic policy 870 associated with this flow-id.

Using this trusted path policing mechanism, the bandwidth of the trusted path 290A is divided among flows from trusted endpoints. Thus, the trusted path 290A can be viewed as having individually policed sub-paths. Since a traffic policy describes allocated bandwidth, each trusted sub-path can essentially be a different "size" or "width".

In contrast, a single traffic policy 880 is applied to packets belonging to untrusted flows. Multiple untrusted flows are assigned the same flow-id. In a preferred embodiment, a number (N) of least-significant bits of the source IP address in a packet determine the flow-id assigned to an untrusted endpoint. For example, if 10 bits are used, there are 1024 ($2^{10}$) flows, and packets from IP addresses X.X.X.12 are assigned to flow #12, packets from IP addresses X.X.X.15 are assigned to flow #15, etc. (In this case, the port number associated with the endpoint is ignored, as are higher-order IP address bits.)

An untrusted flow-id determines which of the untrusted queues 890 the packet will be buffered in, but each untrusted end-point does not have a separate queue. Rather, the packets belonging to untrusted flows are divided among a fixed number of untrusted flow-ids and untrusted queues. Furthermore, a single traffic policy 880 is applied to the untrusted path 290B in the aggregate. Although the untrusted path 290B can be viewed as consisting of multiple sub-paths (since there are multiple untrusted queues), the untrusted sub-paths are not policed separately, as are the trusted sub-paths.

As stated earlier, the traffic manager 240 schedules enqueued packets for transmission to the host processor 130 via the slow path 250. Policing is attained by scheduling packets at different rate on different queues. In deciding which queue to next pull a packet from, the traffic manager 240 uses a scheduling algorithm. Well known scheduling algorithms include round robin (RR) and weighted round robin (WRR). The preferred embodiment uses a WRR scheduler 8100A for trusted queues 860 and a RR scheduler 8100B for untrusted queues 890.

The preferred embodiment also uses a third scheduler 8100C. As shown in FIG. 8, one of the trusted queues 860 is chosen by the WRR scheduler 8100A and one of the untrusted queues 890 is chosen by the RR scheduler 8100B. Then the second-level scheduler 8100C uses a WRR policy to select between the trusted queue and the untrusted queue. This second level ensures that the total bandwidth of packets coming in to the host processor never exceeds a total packet threshold. In this manner, the host processor 130 will not be overwhelmed even when bandwidth is oversubscribed. In the preferred embodiment, the system administrator configures the total packet threshold.

Figure 10:
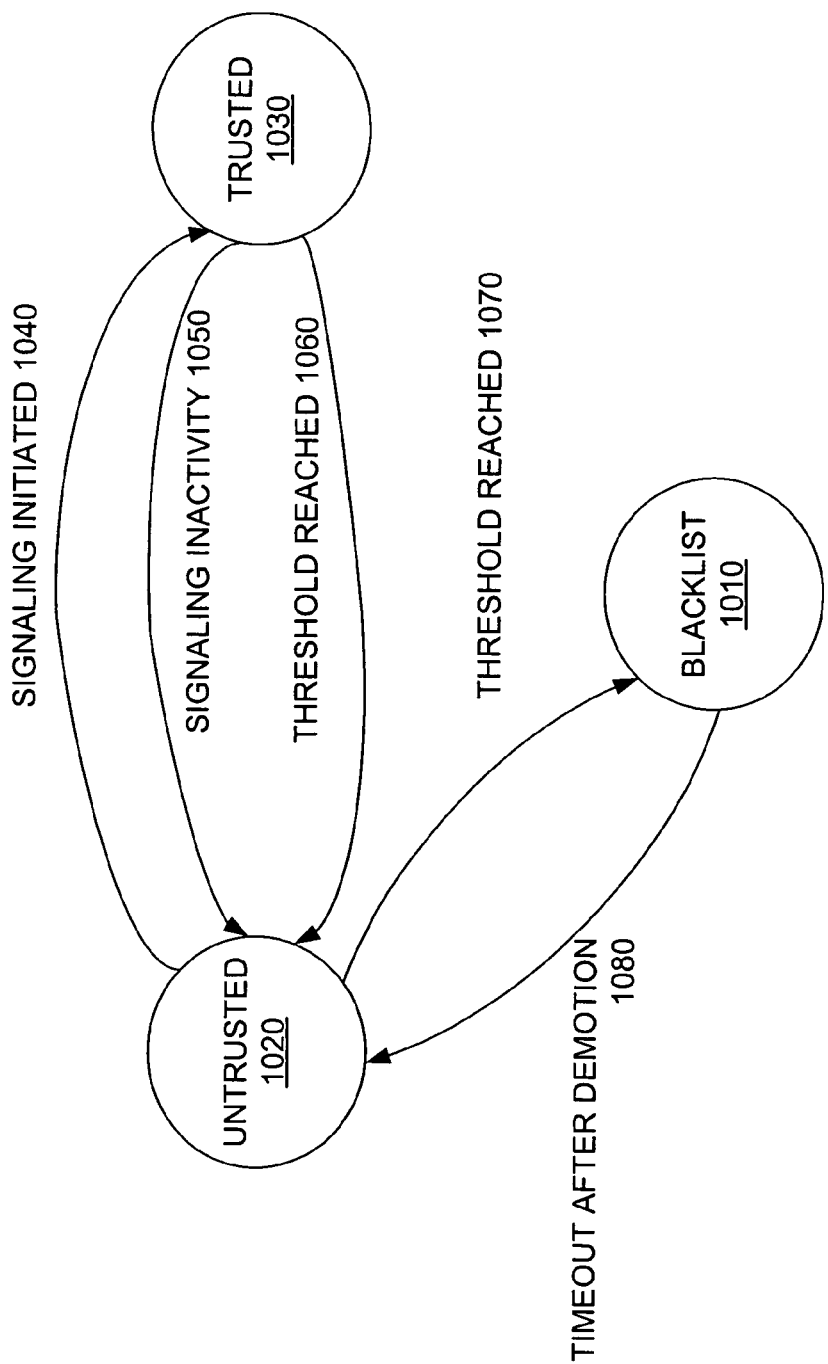
FIG. 10 is a state diagram illustrating one embodiment of the process by which the host processor of FIGS. 2 and 8 manages the contents of the CAM of FIG. 8.

FIG. 10 is a state diagram illustrating how the contents of CAM 810 are managed by an example embodiment of access control system 200. The CAM 810 contains signaling endpoint entries. When a search is performed for a particular endpoint, the resultant data associated with the endpoint is returned. In this example embodiment (200'), the resultant data is a flow-id and a state. In contrast, the resultant data in some of the other embodiments described above contains multiple, separate, pieces of information: (e.g., grant/deny; trusted/untrusted; flow-id).

When an endpoint is in a blacklisted state 1010, access to the fast path 220 is denied. (Thus, the endpoint is neither trusted nor untrusted.) In an untrusted state 1020, the packet is routed to the untrusted path 290B. In a trusted state 1030, the packet is routed to the trusted path 290A

On power-up, the initial state for endpoints is the untrusted state 1020. (Note that this power-up state can be changed during system initialization, as described shortly.) An endpoint is promoted from the untrusted state 1020 to the trusted state 1030 when it sends the SBC 160 a signaling message (1040) that indicates the endpoint is placing a call, is ready for a call, or is terminating a call. In an embodiment based on the SIP protocol, examples of promotion events include a successful SIP registration, or a successful SIP invitation. In this SIP embodiment, an endpoint can also be promoted to trusted on a SIP BYE message, if the endpoint was previously demoted during a call because the permit list is full. In another embodiment based on the MGCP protocol, examples of promotion events include a successful CRCX or successful RSIP. (These signaling messages were discussed earlier in connection with FIG. 6.)

An endpoint is demoted from the trusted state 1030 to the untrusted state 1020 upon a timeout (1050) that indicates the endpoint is no longer engaged in signaling activity. For example, if no signaling messages are sent by an endpoint in a specific time period following a SIP registration message, then there is a timeout and the endpoint is demoted to the untrusted state 1020. As another example, calls to or from an endpoint may be limited to a specific duration, and the expiration of this duration during a call results in a demotion to the untrusted state 1020.

An endpoint is also demoted from the trusted state 1030 to the untrusted state 1020 when a signaling activity threshold (1060) or limit is reached. For example, an endpoint may be limited in the total number of signaling messages it can send to the SBC 160 in a certain period of time, and exceeding this limit results in a demotion to the untrusted state 1020. Another limit could be the total number of calls that an endpoint can make or accept, through the SBC 160, in a certain period of time. Another threshold may be the number of invalid signaling messages sent per unit of time. Yet another threshold may be the number of unparseable signaling messages sent per unit of time.

An endpoint is demoted from the untrusted state 1020 to the blacklisted state 1010 when a signaling activity threshold (1070) or limit is reached. Examples of such thresholds include the number of invalid messages or the total number of messages. An endpoint remains in the blacklisted state 1010 for a period of time after demotion from the untrusted state 1020. When that time period expires (1080), the endpoint is promoted back to the untrusted state 1020.

A system administrator can use a network management interface to force an endpoint to be in a particular state. In one embodiment, the system administrator can force and endpoint to be in either the trusted state 1030 or the blacklisted state 1010. An endpoint which reaches the blacklisted state 1010 in this manner remains so, and is not promoted to the untrusted state 1020 after a denial timeout. These user-configured settings can be stored in non-volatile memory and applied during the system initialization routine to remain in effect through a reboot of the SBC 160.

Figure 11:
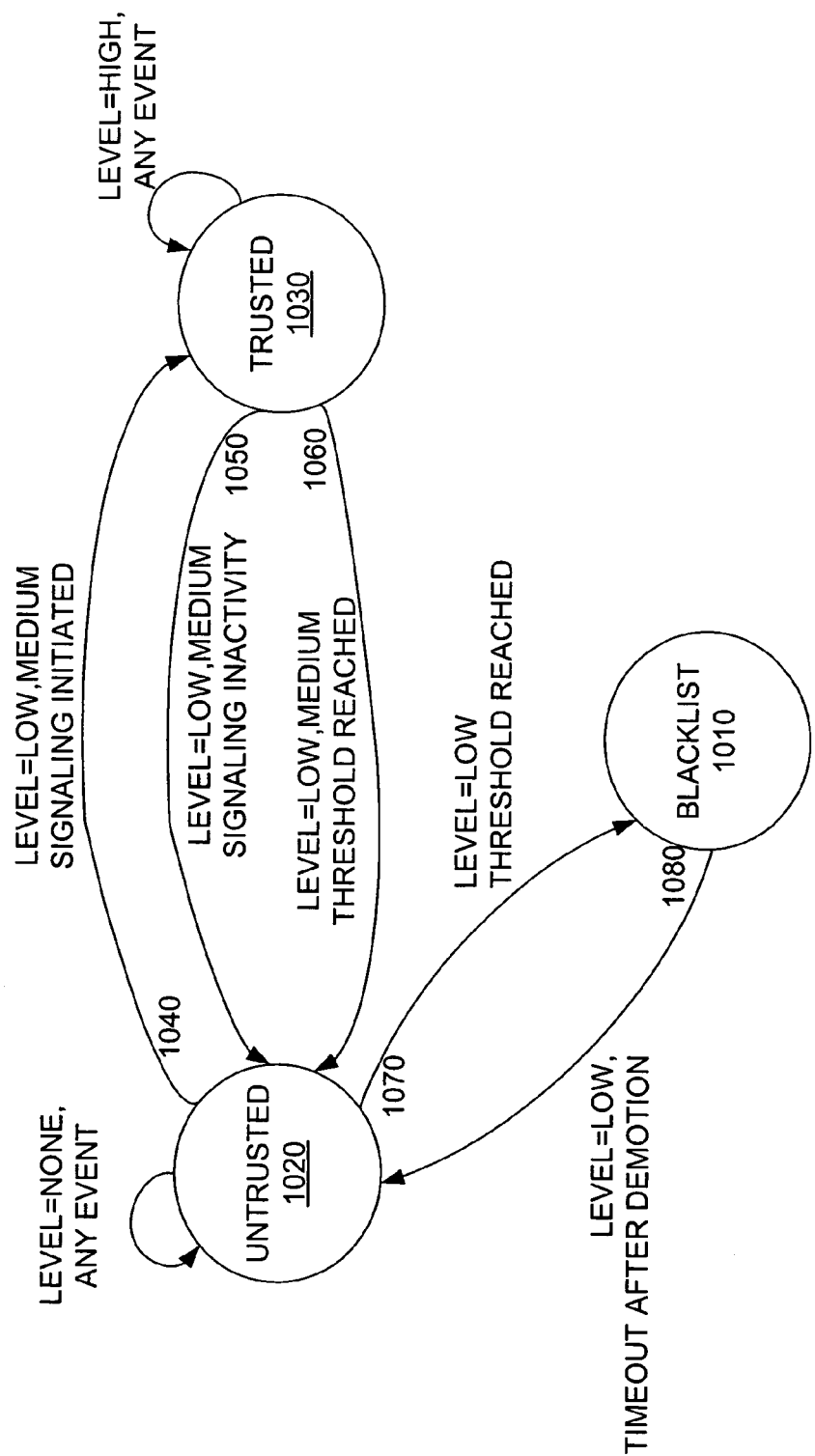
FIG. 11 is a state diagram illustrating another embodiment of the process by which the host processor of FIGS. 2 and 8 manages the contents of the CAM of FIG. 8.

FIG. 11 is a state diagram illustrating how the contents of CAM 810 are managed by another example embodiment of access control system 200. As with the embodiment 200' of FIG. 10, the state associated with an endpoint determines the path traveled by packets received from that endpoint. Packets from an endpoint in the trusted state 1030 are routed along the trusted path 290A. Packets from an endpoint in the untrusted state 1020 are routed along the untrusted path 290B. Packets from an endpoint in the blacklisted state 1010 are denied access to fast path 220.

In this embodiment (200'), each endpoint is associated with a trust level, and state transitions depend on this trust level as well as other events (e.g., signaling activity, timeouts, exceeding a threshold, etc.) Specifically, the trust level determines which states the endpoint may transition between. In example embodiment 200", there are four trust levels: high; medium; low and none. An endpoint with a high trust level remains in the trusted state 1030. An endpoint with a medium trust level transitions between the untrusted state 1020 and the trusted state 1030. An endpoint with a low trust level transitions between all three states. Finally, an endpoint with a trust level of none remains in the untrusted state 1020.

The initial state for an endpoint depends on the trust level associated with the endpoint. Endpoints with a high trust level start in the trusted state 1030. Furthermore, these endpoints are unaffected by signaling activity and remain in the trusted state 1030. Endpoints with a trust level of none start in the untrusted state 1020, and remain in the untrusted state 1020.

Endpoints with a medium trust level are promoted from the untrusted state 1020 to the trusted state 1030 on sending the SBC 160 a signaling message (1040) that indicates the endpoint is placing a call, is ready for a call, or is terminating a call. Endpoints with a medium trust level are demoted from the trusted state 1030 to the untrusted state 1020 upon a timeout (1050) that indicates the endpoint is no longer engaged in signaling activity, or when a signaling activity threshold (1060) is reached. (Examples of such promotion and demotion events were discussed earlier in connection with FIG. 10.)

Endpoints with a low trust level are promoted from the untrusted state 1020 to the trusted state 1030 on sending the SBC 160 a signaling message (1040) that indicates the endpoint is placing a call, is ready for a call, or is terminating a call. Endpoints with a low trust level are demoted from the trusted state 1030 to the untrusted state 1020 upon a timeout (1050) that indicates the endpoint is no longer engaged in signaling activity, or when a signaling activity threshold (1060) is reached. Endpoints with a low trust level are demoted from the untrusted state 1020 to the blacklisted state 1010 on reaching a signaling activity threshold (1070) (discussed in connection with FIG. 10.) Endpoints with a low trust level remain in the blacklisted state 1010 for a period of time after demotion, and are promoted back to the untrusted state 1020 upon expiration of the time period.

The above embodiments relate to protecting a session border controller from a DoS attack by controlling access to a host processor. In these embodiments, the host processor examines and modifies call signaling packets. However, many other types of network devices also contain host processors, and are also vulnerable to DoS attacks. The principles of the invention also apply to host processors that examine other types of packets.

In particular, the system and method for controlling access to a host processor is advantageous for any network device that receives a request for service from a client (endpoint), and performs some level of authentication before granting the request. Several different Internet protocols are specifically directed to receiving service requests and performing authentication, for example, HyperText Transfer Protocol Secure (HTTPS), Secure Sockets Layer (SSL), and Transport Layer Security (TLS).

The system and method for controlling access to a host processor is applicable to protocols such as these. A client becomes trusted after authentication. On receipt of a subsequent packet from the trusted client, the classifier selects the fast path and the traffic manager routes the packet to the host processor on the fast path. Clients who have not yet become authenticated are untrusted. On receipt of a packet from an untrusted client, the classifier selects the slow path and the traffic manager routes the packet to the host processor on the slow path. Clients who fail authentication may be treated as untrusted, or may be denied access to the host processor completely. As with the embodiments described above, the fast path may be made of sub-paths, and paths/sub-paths can be associated with policies.

The Domain Name Service (DNS) protocol is known to be vulnerable to DoS attacks, even though the protocol does not specifically provide authentication. The system and method for controlling access to a host processor is applicable to a variation or extension to DNS where a DNS client that becomes trusted through some sort of authentication is allowed access to the host processor via the fast path. Untrusted clients are routed to the host processor along the slow path, and some clients can be blacklisted and denied access to the host processor completely.

The foregoing description has been presented for purposes of illustration and description. It is not intended to be exhaustive or to limit the invention to the precise forms disclosed. Obvious modifications or variations are possible in light of the above teachings. The embodiments discussed, however, were chosen and described to illustrate the principles of the invention and its practical application to thereby enable one of ordinary skill in the art to utilize the invention in various embodiments and with various modifications as are suited to the particular use contemplated. All such modifications and variation are within the scope of the invention as determined by the appended claims when interpreted in accordance with the breadth to which they are fairly and legally entitled.

Therefore, having thus described the invention, at least the following is claimed:

1. A system comprising:
a host processor configured to manage calls in a network, each call associated with a plurality of signaling packets, each signaling packet comprising a source endpoint identifier; and
a traffic manager coupled to the host processor via a first path and a second path, each path associated with a bandwidth limit for a respective one of the paths,
the traffic manager configured to receive the plurality of signaling packets and to communicate at least a first portion of the plurality of signaling packets to the host processor via a selected one of the paths,
the traffic manager further configured to regulate traffic along the first path such that the bandwidth limit of the first path is respected, and to regulate traffic along the second path such that the bandwidth limit of the second path is respected.

2. The system of claim 1, wherein each path is associated with a respective policy defining the bandwidth limit for the respective one of the paths, and the traffic manager is further configured to apply the first policy to regulate traffic along the first path such that the bandwidth limit of the first path is respected, and to apply the second policy to regulate traffic along the second path such that the bandwidth limit of the second path is respected.

3. The system of claim 1, wherein the first policy comprises at least one of a peak data rate, an average data rate, and a maximum burst size.

4. The system of claim 1, wherein the traffic manager is further configured to select one of the paths for communication to the host processor based on the source endpoint identifier.

5. The system of claim 1, wherein traffic manager is further configured to select the first path when the source endpoint identifier has previously registered with the session controller and to select the second path otherwise.

6. The system of claim 1, wherein the first path comprises a plurality of sub-paths, each sub-path associated with a respective policy defining a bandwidth limit for the sub-path, wherein the traffic manager is further configured to apply the policy associated with the sub-path to regulate traffic along the sub-path such that the bandwidth limit of the sub-path is respected.

7. The system of claim 6, wherein each signaling packet comprises a source endpoint identifier and the traffic manager is further configured to select one of the sub-paths for communication to the host processor based on the source endpoint identifier.

8. The system of claim 1, wherein the traffic manager is further configured to selectively route at least a second portion of the plurality of signaling packets to a third path, the selection based on the source endpoint identifier of the signaling packet, the third path not coupled to the host processor.

9. The system of claim 1, wherein the host processor is further configured to examine each signaling packet and to maintain signaling statistics associated with the endpoint identifier in the signaling packet.

10. The system of claim 9, wherein the selection by the traffic manager is based on the source endpoint identifier of the signaling packet and the signaling statistics associated with that endpoint.

11. A method implemented in a session border controller, comprising the steps of:
receiving a plurality of signaling packets, each signaling packet comprising a source endpoint identifier; and controlling access to a host processor of the session border controller by a traffic manager, via a first and a second path, for at least a portion of the signaling packets in accordance with a bandwidth limit for a respective one of the paths by regulating traffic along the first path such that the bandwidth limit of the first path is respected, and by regulating traffic along the second path such that the bandwidth limit of the second path is respected.

12. The method of claim 11, wherein the controlling access step further comprises the step of:
selectively denying access to the host processor for at least one of the signaling packets, responsive to the source endpoint identifier of the at least one packet.

13. The method of claim 12, wherein the denying step further comprises the steps of:
comparing the source endpoint identifier of the at least one signaling packet to a first list and a second list; and
denying access when the source endpoint identifier is contained in the first list and is not contained in the second list.

14. The method of claim 12, further comprising the step of:
discarding those packets in the plurality of signaling packets that are denied access to the host processor.

15. The method of claim 12, further comprising the steps of:
marking those packets in the plurality of signaling packets that are denied access to the host processor; and
accumulating statistics associated with the marked packets.

16. The method of claim 11, wherein the controlling access step further comprises the step of:
controlling access to the host processor in accordance with a first and a second policy, each policy defining the bandwidth limit for a respective one of the paths.

17. The method of claim 16, wherein the controlling step further comprises the step of:
applying the first policy to the first path such that the bandwidth limit of the first path is respected.

18. The method of claim 16, wherein the controlling step further comprises the steps of:
routing at least one of the received signaling packets on the first path when the signaling packet does not violate the first policy; and
routing at least one of the received signaling packets on a third path not coupled to the host processor when the signaling packet does violate the first policy.

19. The method of claim 16, wherein the first policy comprises at least one of a peak data rate, an average data rate, and a maximum burst size.

20. The method of claim 11, wherein the controlling access step further comprises the steps of:
selecting one of the paths, responsive to the source endpoint identifier of the signaling packet; and
routing the signaling packet to the host processor via the selected path.

21. The method of claim 11, further comprising the steps of:
examining a signaling layer message contained in each signaling packet;
maintaining a state associated with each source endpoint identifier responsive to the signaling layer message;
selecting one of the paths for the signaling packet, responsive to the state of the source endpoint identifier of the signaling packet; and
routing the signaling packet to the host processor via the selected path.

22. The method of claim 21, wherein the maintaining step further comprises the steps of:
promoting an endpoint to a trusted state responsive to a signaling layer registration message; and
selecting the first path for the signaling packet when the endpoint is in the trusted state.

23. The method of claim 21, wherein the maintaining step further comprises the step of:
demoting an endpoint to an untrusted state responsive to a timeout after promotion of the endpoint.

24. A system comprising:
means for receiving a plurality of signaling packets, each signaling packet comprising a source endpoint identifier; and
means for controlling access to a host processor by a traffic manager, via a first and a second path, for at least a portion of the signaling packets in accordance with a bandwidth limit for a respective one of the paths by regulating traffic along the first path such that the bandwidth limit of the first path is respected, and by regulating traffic along the second path such that the bandwidth limit of the second path is respected.

25. The system of claim 24, further comprising:
means for selectively denying access to the host processor for a portion of the signaling packets, responsive to the source endpoint identifier of the packet.

26. The system of claim 24, further comprising:
means for comparing the source endpoint identifier of the signaling packet to a first list and a second list; and
means for denying access when the source endpoint identifier is contained in the first list and is not contained in the second list.

27. The system of claim 24, wherein the means for controlling further comprises:
means for applying a first policy to the first path such that the bandwidth limit of the first path is respected.

28. The system of claim 27, wherein the first policy comprises at least one of a peak data rate, an average data rate, and a maximum burst size.

29. The system of claim 27, further comprising:
means for routing a signaling packet onto the first path when the signaling packet does not violate the first policy.

30. The system of claim 27, further comprising:
means for routing a signaling packet onto a third path not coupled to the host processor when the signaling packet does violate the first policy.

31. The system of claim 24, further comprising:
means for selecting one of the paths, responsive to the source endpoint identifier of the signaling packet; and
means for routing the signaling packet to the host processor via the selected path.

32. The system of claim 24, further comprising:
means for examining a signaling layer message contained in each signaling packet;
means for maintaining a state associated with each source endpoint identifier responsive to the signaling layer message; and
means for selecting one of the paths for the signaling packet, responsive to the state of the source endpoint identifier of the signaling packet; and
means for routing the signaling packet to the host processor via the selected path.

33. The system of claim 32, further comprising:
means for promoting an endpoint to a trusted state responsive to a signaling layer registration message; and means for selecting the first path for the signaling packet when the endpoint is in the trusted state.

34. The system of claim 32, wherein the means for maintaining further comprises:
   means for demoting an endpoint to an untrusted state responsive to a timeout after promotion of the endpoint.

35. A method implemented in a session border controller, comprising the steps of:
   receiving a plurality of signaling packets, each signaling packets comprising a source endpoint identifier; and
   selecting a first or a second path, responsive to the source endpoint identifier of the packet, for at least a portion of the packets in accordance with a bandwidth limit for a respective one of the paths; and
   routing by a traffic manager each packet in the portion of packets to a host processor of the session border controller via the selected path to respect the bandwidth limit of the first path and the bandwidth limit of the second path.

36. The method of claim 35, further comprising the steps of:
   examining, in the host processor, a service request contained in a first packet routed to the host processor;
   responsive to the service request, maintaining a state associated with the source endpoint identifier of the first packet;
   selecting one of the paths for a second packet, responsive to the state of the source endpoint identifier of the first packet; and
   routing the second packet to the processor via the selected path.

37. The method of claim 36, wherein the maintaining step further comprises the steps of:
   promoting an endpoint to a trusted state responsive to the service request; and
   selecting the first path for the second packet when the endpoint is in the trusted state.

38. The method of claim 36, wherein the maintaining step further comprises the step of:
   demoting an endpoint to an untrusted state responsive to a timeout after promotion of the endpoint.

39. The system of claim 1, wherein the traffic manager is separate from the host processor.

40. The system of claim 1, wherein the traffic manager is a chipset that is separate from the host processor.

41. The method of claim 35, wherein the selecting and routing is performed by hardware rather than by software.

42. The method of claim 35, wherein the selecting and routing is performed by hardware rather than by software executing on the host processor.

* * * * *